(12) United States Patent
Wikström et al.

(10) Patent No.: US 12,429,129 B2
(45) Date of Patent: Sep. 30, 2025

(54) ASSEMBLY FOR LUBRICATING A GEARWHEEL OF A TRANSMISSION, A TRANSMISSION AND A VEHICLE

(71) Applicant: Volvo Truck Corporation, Gothenburg (SE)

(72) Inventors: Anna Wikström, Göteborg (FR); Anders Hedman, Marstrand (SE); Henrik Hagerman, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/970,085

(22) Filed: Dec. 5, 2024

(65) Prior Publication Data
US 2025/0198502 A1 Jun. 19, 2025

(30) Foreign Application Priority Data

Dec. 15, 2023 (EP) .................................... 23217261

(51) Int. Cl.
*F16H 57/04* (2010.01)
(52) U.S. Cl.
CPC ..... *F16H 57/0431* (2013.01); *F16H 57/0427* (2013.01); *F16H 57/0428* (2013.01)
(58) Field of Classification Search
CPC . F16H 57/043; F16H 4/31; F16H 4/27; F16H 4/28; F16H 57/08
See application file for complete search history.

(56) References Cited

U.S. PATENT DOCUMENTS

| | | | | |
|---|---|---|---|---|
| 7,220,208 | B2* | 5/2007 | Hedman | F16H 57/0482 475/159 |
| 11,662,015 | B2* | 5/2023 | Hagerman | F16H 57/0484 475/252 |
| 11,754,171 | B2* | 9/2023 | Zetterstrand | F16H 57/0431 74/467 |
| 2020/0300355 | A1 | 9/2020 | Forsberg et al. | |
| 2023/0023243 | A1 | 1/2023 | Hagerman et al. | |

FOREIGN PATENT DOCUMENTS

| | | |
|---|---|---|
| EP | 1817512 A1 | 8/2007 |
| JP | 2007002878 A | 1/2007 |

OTHER PUBLICATIONS

Extended European Search Report, European Patent Application No. 23217261.9, mailed May 10, 2024, 9 pages.

\* cited by examiner

*Primary Examiner* — Bobby Rushing, Jr.
(74) *Attorney, Agent, or Firm* — Sage Patent Group

(57) ABSTRACT

An assembly for lubricating a gearwheel of a transmission includes a shaft arranged to rotate about a rotational axis extending in an axial direction, the gearwheel arranged rotationally fixed on the shaft, a first ring member arranged coaxially and rotationally fixed on the shaft adjacent the gearwheel, and a lubricant distribution ring member for providing lubricant to gear valleys between respective adjacent gear teeth of the gearwheel.

15 Claims, 8 Drawing Sheets

ASSEMBLY FOR LUBRICATING A GEARWHEEL OF A TRANSMISSION, A TRANSMISSION AND A VEHICLE

CROSS REFERENCE TO RELATED APPLICATIONS

This application claims priority to European Patent Application No. 23217261.9, filed on Dec. 15, 2023, the disclosure and content of which is incorporated by reference herein in its entirety.

TECHNICAL FIELD

The disclosure relates generally to lubrication in vehicle transmissions. In particular aspects, the disclosure relates to an assembly for lubricating a gearwheel of a transmission, a transmission and a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Gearwheels used in transmissions generally require lubrication to function properly. For example, it may be required to lubricate gear teeth of the gearwheel which are in meshing engagement with gear teeth of another gearwheel. There is a strive to develop improved technology relating to lubrication of gearwheels.

SUMMARY

According to a first aspect of the disclosure, there is provided an assembly for lubricating a gearwheel of a transmission, the assembly comprising:
- a shaft arranged to rotate about a rotational axis extending in an axial direction,
- the gearwheel arranged rotationally fixed on the shaft, the gearwheel comprising a plurality of gear teeth arranged circumferentially around the gearwheel with respect to the rotational axis,
- a first ring member arranged coaxially and rotationally fixed on the shaft adjacent the gearwheel, wherein the first ring member has an axial end face comprising a circumferential portion which protrudes in the axial direction towards the gearwheel such that an inner peripheral surface is formed on the circumferential portion, wherein the inner peripheral surface of the circumferential portion, the axial end face of the first ring member, the gearwheel, and the shaft, define a space,
- a lubricant distribution ring member for providing lubricant to gear valleys between respective adjacent gear teeth of the gearwheel, wherein the lubricant distribution ring member is arranged inside the space, and wherein at least one of the first ring member, the gearwheel and the lubricant distribution ring member is configured such that the lubricant distribution ring member is axially press-fitted between the gearwheel and the first ring member. The first aspect of the disclosure may seek to improve lubrication to the gearwheel in a cost-effective manner. A technical benefit may include that the axial press-fit of the lubricant distribution ring member prevents unwanted leakage of lubricant in the vicinity of the first ring member and the gearwheel. This may imply improved lubrication, e.g., allowing more lubricant to lubricate the gear teeth of the gearwheel. Another technical benefit may include that machining of the different parts of the assembly may be facilitated, e.g., requiring less strict tolerance levels of the different parts.

In some embodiments, the circumferential portion of the first ring member is in axial contact with the gear teeth of the gearwheel. For example, the circumferential portion of the first ring member may be in axial contact with each one of the gear teeth of the gearwheel. A technical benefit may include a reduced risk of leakage in the vicinity of the first ring member and the gearwheel.

In some embodiments, the lubricant distribution ring member has a first radially outer peripheral surface which is proximate the gearwheel, wherein the inner peripheral surface of the circumferential portion and the first radially outer peripheral surface of the lubricant distribution ring member are configured such that a radial gap is formed therebetween, wherein the radial gap is arranged to provide lubricant to the gear valleys. A technical benefit may include that improved lubrication is achieved, allowing lubricant to flow axially in the radial gap towards and into the gear valleys.

In some embodiments, the gearwheel has a gear root diameter which is defined as a diameter of a circle which touches bottom portions of the gear valleys, wherein a diameter of the first radially outer peripheral surface is larger than the gear root diameter. A technical benefit may include improved lubrication, e.g., the impact of variations of the gear root diameter on lubricant flow to the gearwheel may be reduced. Accordingly, by being larger in this context may mean that the diameter of the first radially outer peripheral surface is larger than the gear root diameter, also when considering tolerance variations.

In some embodiments, the lubricant distribution ring member comprises at least one radially extending opening which fluidly connects a portion of the space inside the lubricant distribution ring member with the gear valleys. A technical benefit may include an improved flow path of lubricant to the gear valleys. For example, the at least one radially extending opening may have a cross-sectional area which is larger than a cross-sectional area of the radial gap. This may imply improved lubrication flow to the gearwheel.

In some embodiments, the lubricant distribution ring member comprises a circumferentially extending lubricant reservoir which fluidly connects the at least one radially extending opening with the gear valleys. A technical benefit may include an improved flow path of lubricant to the gear valleys. Another technical benefit may include more reliable lubrication to the gear valleys, e.g., reducing the risk of lubricant shortage.

In some embodiments, the shaft comprises a lubricant conduit which is in fluid communication with the space. A technical benefit may include an improved flow path of lubricant to the gear valleys.

In some embodiments, the lubricant distribution ring member is radially press-fitted in the space. A technical benefit may include an improved flow path of lubricant to the gear valleys, e.g., a high degree of concentricity of the above-mentioned radial gap. Another technical benefit may include a reduced risk of unwanted lubricant leakage. In some embodiments, the lubricant distribution ring member is radially guided in the space, such as radially guided with a tight fit, but no radial press-fit. Radially guided, such as radially guided with a tight fit, but no radial press-fit, may imply facilitated mounting of the lubricant distribution ring member. For example, radially guided may imply a sufficient degree of concentricity.

In some embodiments, the lubricant distribution ring member has a second radially outer peripheral surface, wherein the inner peripheral surface of the circumferential portion of the first ring member and the second radially outer peripheral surface of the lubricant distribution ring member are configured such that the second radially outer peripheral surface is radially press-fitted against the inner peripheral surface of the circumferential portion of the first ring member. A technical benefit may include an improved configuration for achieving the radial press-fit, e.g., a cost-effective configuration and/or a robust and reliable configuration.

In some embodiments, the lubricant distribution ring member has a radially inner peripheral surface and the gearwheel has a radially outer peripheral surface arranged inside the space, wherein the radially inner peripheral surface of the lubricant distribution ring member and the radially outer peripheral surface of the gearwheel are configured such that the radially inner peripheral surface of the lubricant distribution ring member is radially press-fitted against the radially outer peripheral surface of the gearwheel. A technical benefit may include an improved configuration for achieving the radial press-fit, e.g., a cost-effective configuration and/or a robust and reliable configuration.

In some embodiments, the axial press-fit of the lubricant distribution ring member between the gearwheel and the first ring member is arranged such that an axially protruding portion, such as an axially protruding portion of the first ring member, the gearwheel, and/or the lubricant distribution ring member, deforms the lubricant distribution ring member in the axial direction. A technical benefit may include an improved configuration for achieving the axial press-fit, e.g., a cost-effective configuration and/or a robust and reliable configuration.

In some embodiments, the axially protruding portion is located proximate the inner peripheral surface of the circumferential portion of the first ring member. A technical benefit may include an improved configuration for achieving the axial press-fit, e.g., a cost-effective configuration and/or a robust and reliable configuration. For example, the aforementioned configuration may imply a reduced risk of lubricant leakage.

In some embodiments, the lubricant distribution ring member is U-shaped, as seen in a sectional plane defined by the rotational axis and a radial direction from the rotational axis. A technical benefit may include a cost-effective configuration and/or a configuration which may allow the lubricant distribution ring member to flex so that the axial press-fit is improved.

In some embodiments, the gearwheel is a sun gearwheel of a planetary gear.

In some embodiments, the first ring member is an engaging ring for selectively rotationally connecting a ring gearwheel of the planetary gear with the shaft. A technical benefit may include that the engaging ring is configured for achieving the lubrication, i.e., this may imply a cost-effective and/or a compact configuration.

In some embodiments, the gearwheel is a separate member with respect to the shaft or integrated with the shaft.

In some embodiments, the first ring member is a separate member with respect to the shaft or integrated with the shaft.

In some embodiments, the lubricant distribution ring member is made of at least two separate parts which are divided along a sectional plane which is perpendicular to the rotational axis. A technical benefit may include that the lubricant distribution ring member can be made in a more cost-effective manner.

According to a second aspect of the disclosure, there is provided a transmission for a vehicle comprising the assembly according to any one of the examples of the first aspect of the disclosure. Advantages, benefits and effects of the second aspect of the disclosure are analogous to the advantages, benefits and effects of the first aspect of the disclosure. For example, the assembly may form part of a range gear of the transmission, wherein the range gear is configured to provide a low range mode and a high range mode, wherein the low range mode provides an input/output speed reduction in relation to the high range mode. The range gear may comprise the herein mentioned planetary gear. The high range mode may have a 1:1 input/output speed ratio.

According to a third aspect of the disclosure, there is provided a vehicle comprising the assembly according to any one of the examples of the first aspect of the disclosure or the transmission according to any one of the examples of the second aspect of the disclosure.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended

DRAWINGS

Figure 1:
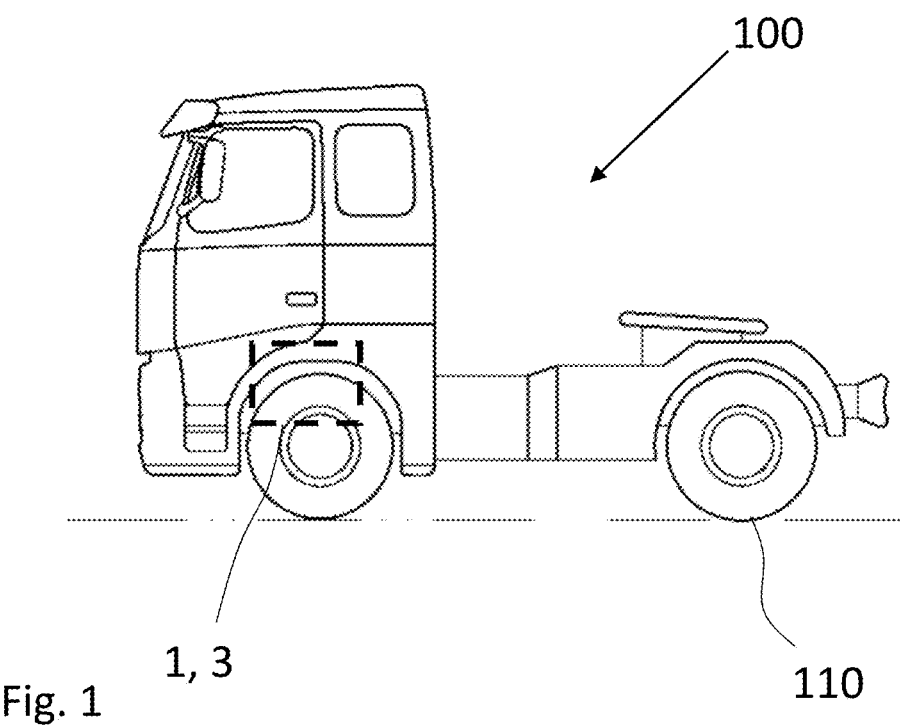

FIG. 1 is an exemplary vehicle in a side view according to an example.

Figure 2:
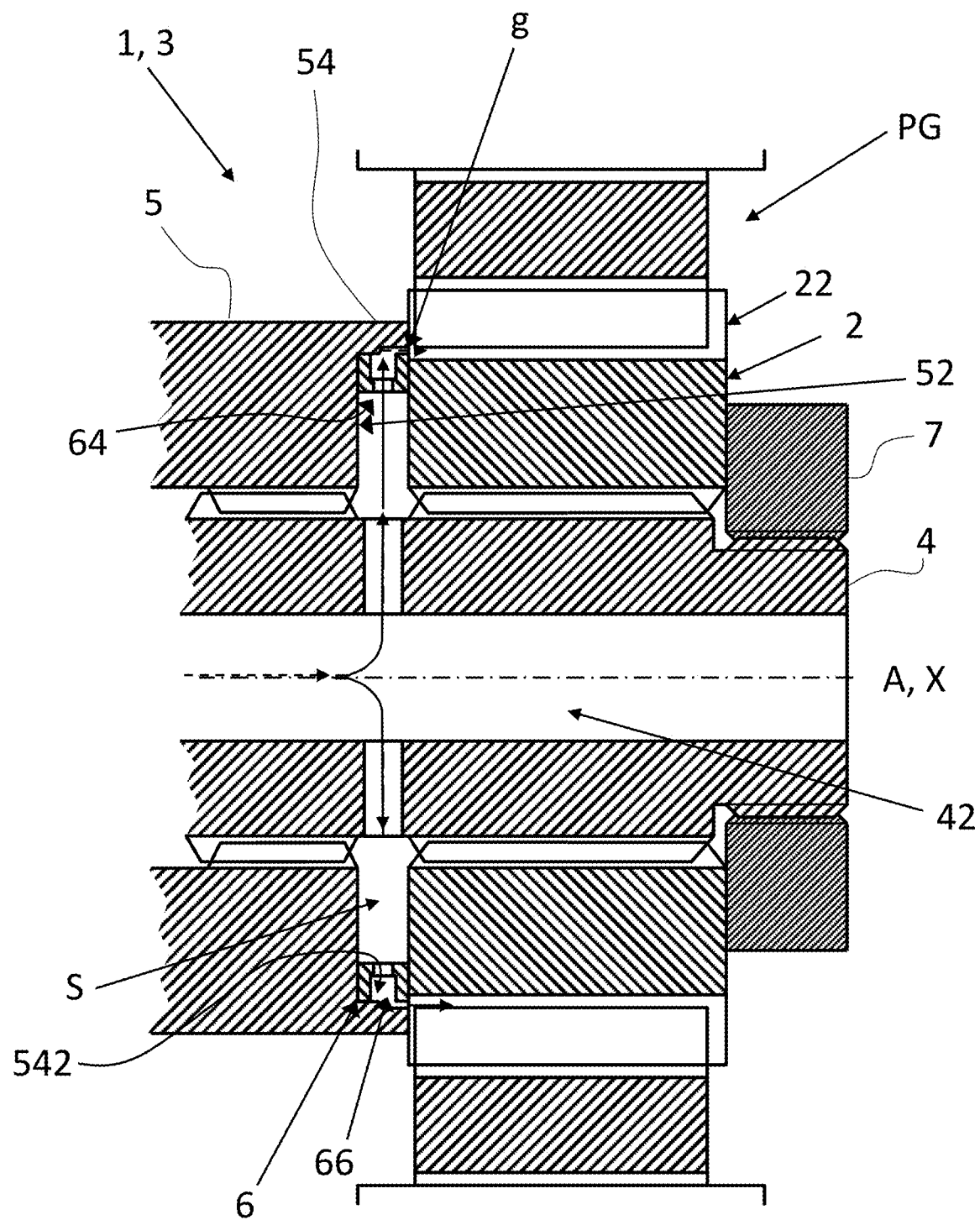

FIG. 2 is an exemplary assembly in a sectional view according to an example.

Figure 3:
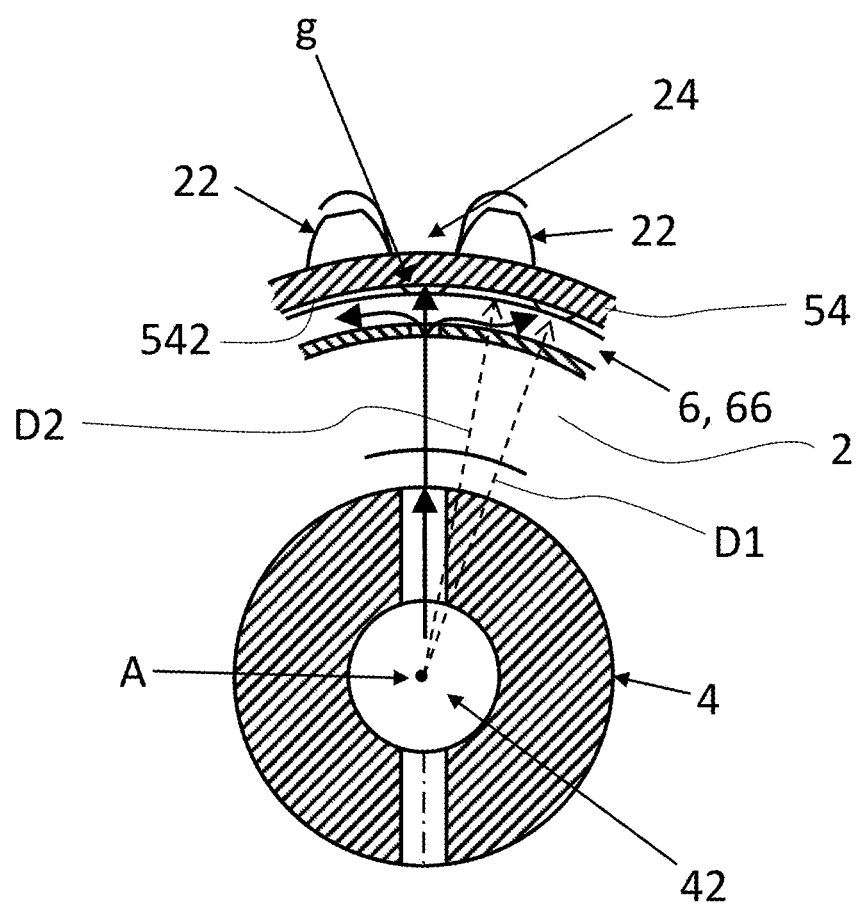

FIG. 3 is an exemplary assembly in another sectional view according to an example.

Figure 4A:
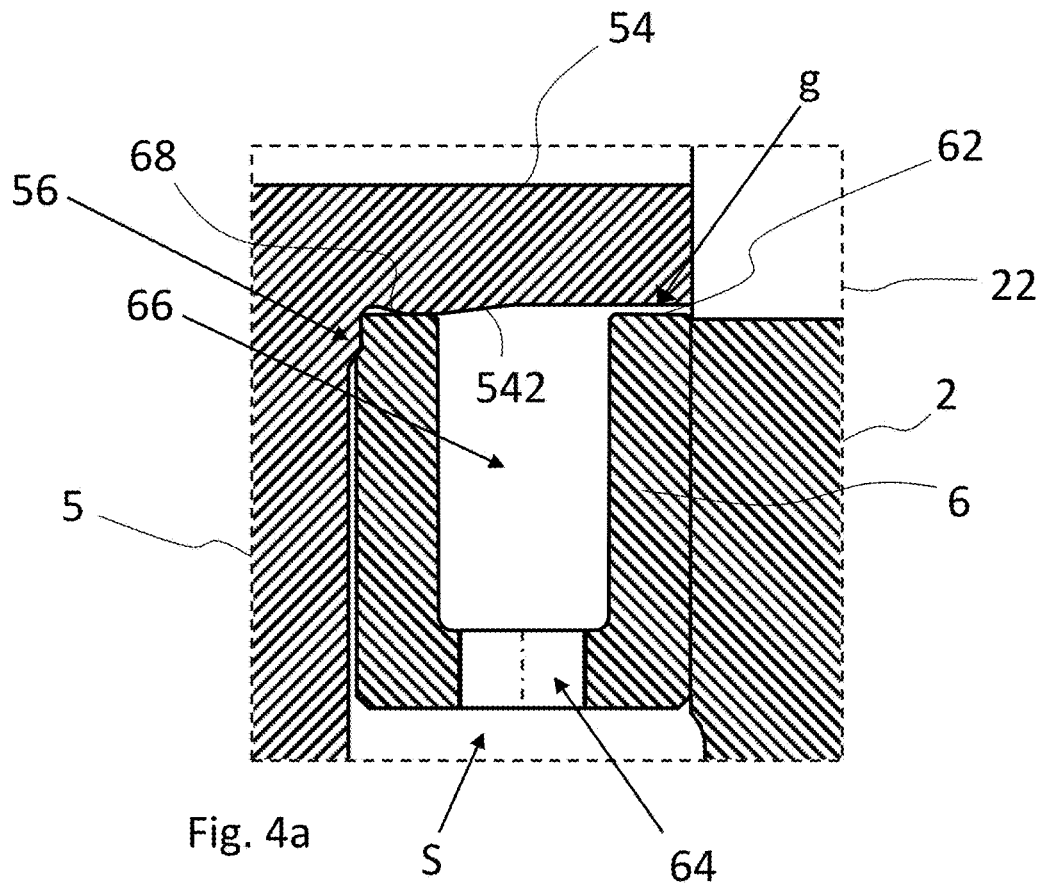
Figure 4B:
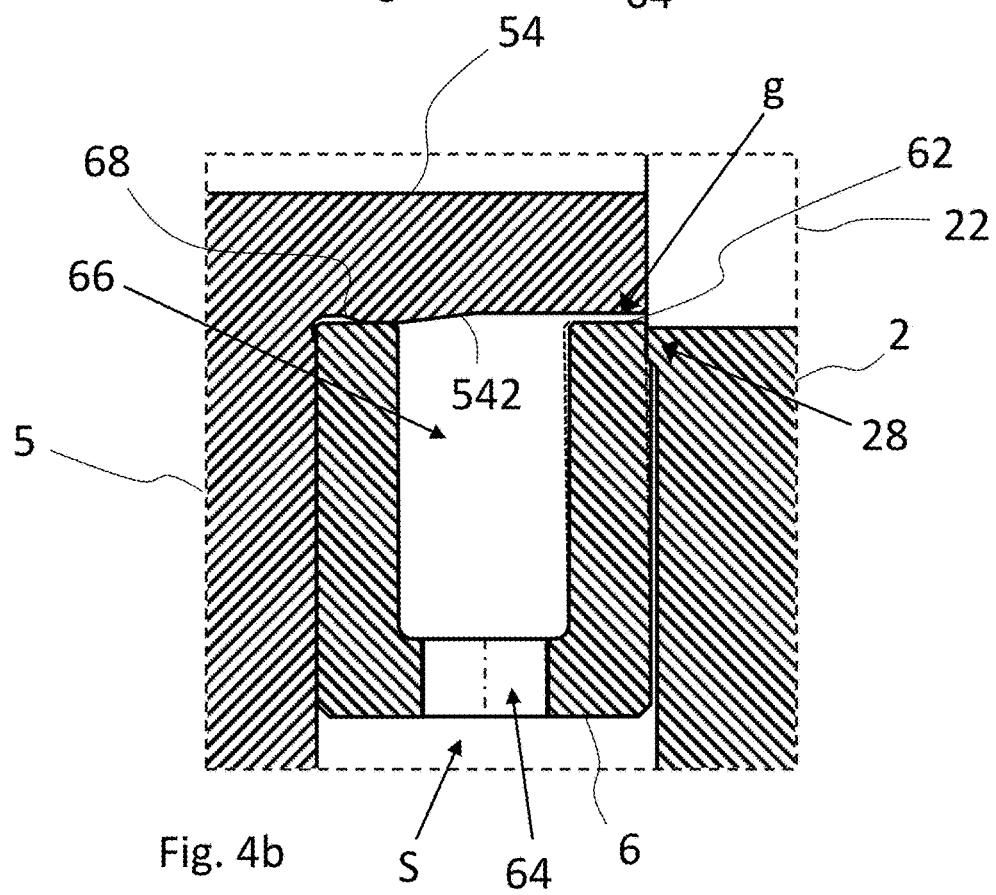
Figure 4C:
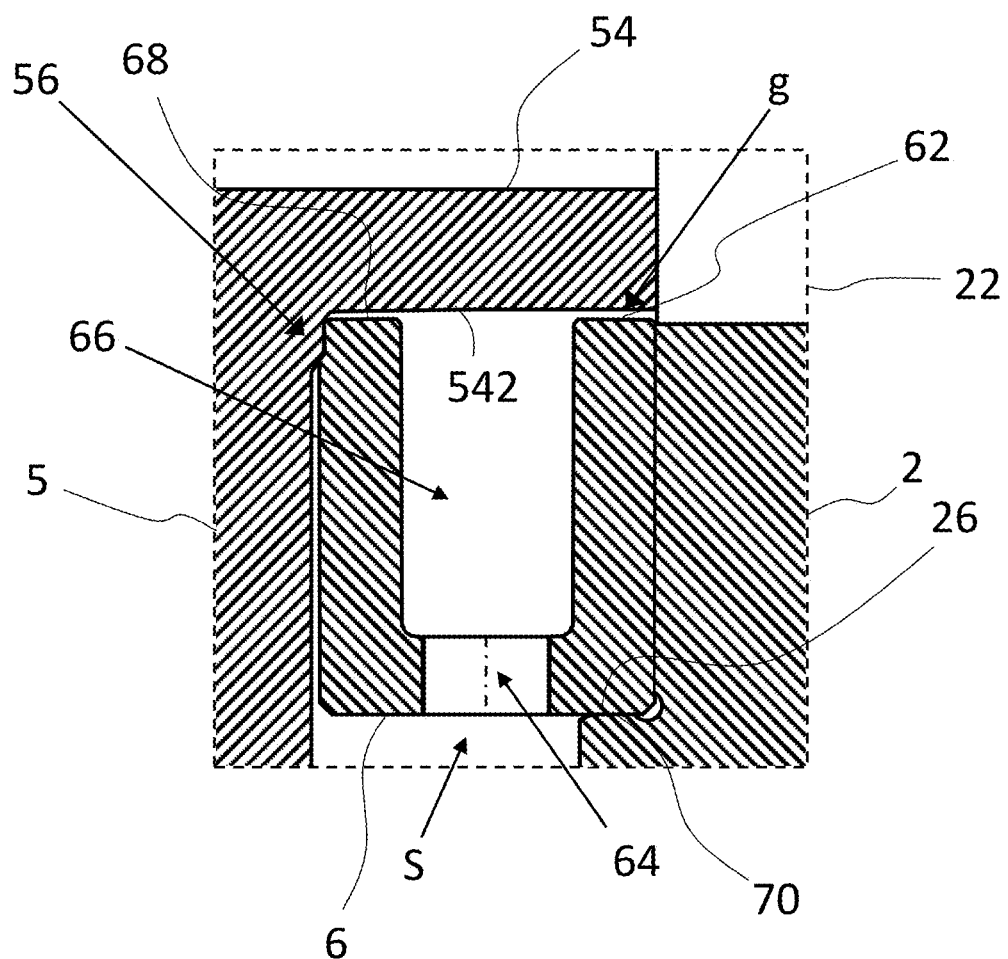

FIGS. 4a-c are exemplary assemblies in sectional views according to examples.

Figure 5:
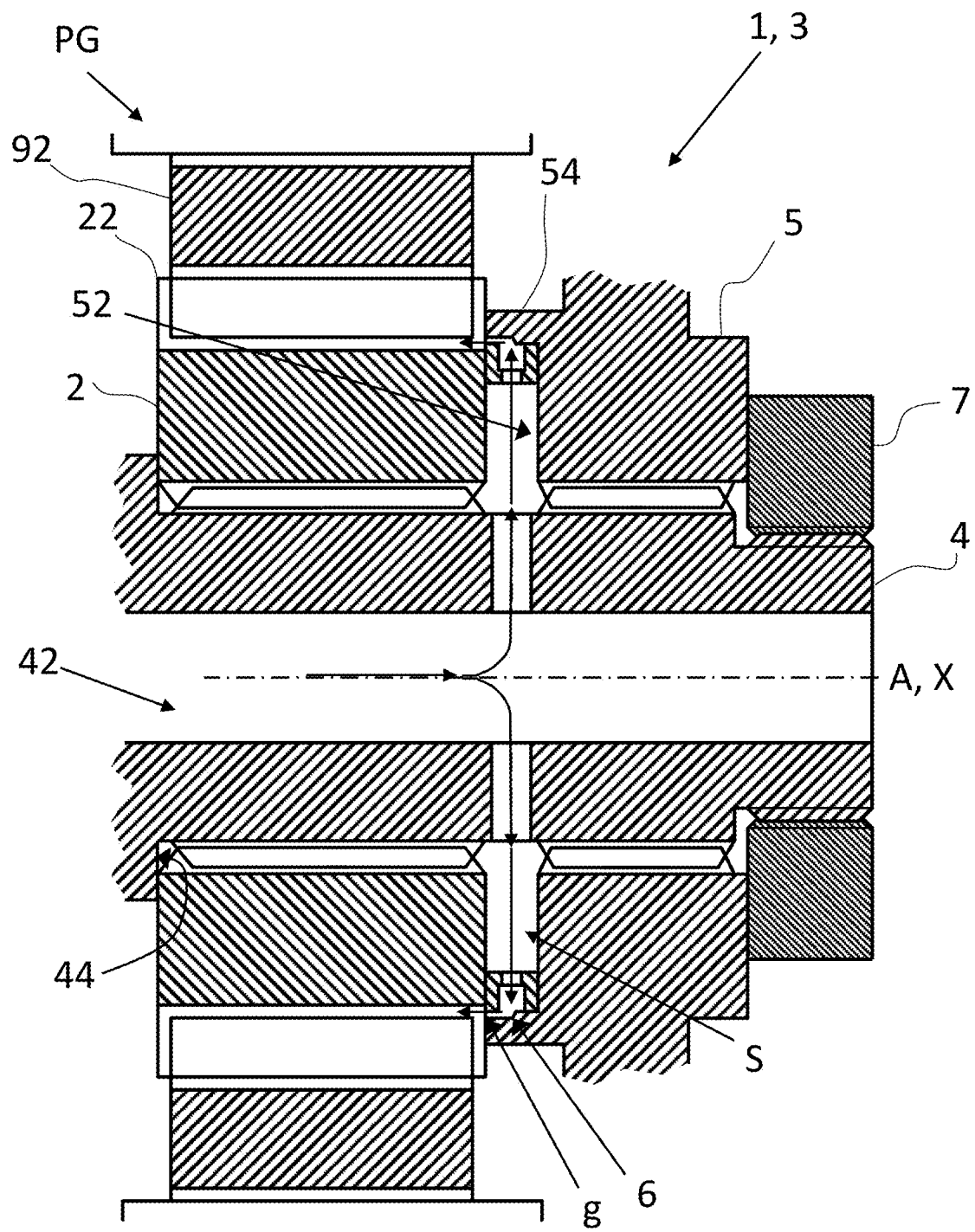

FIG. 5 is an exemplary assembly in a sectional view according to another example.

Figure 6:
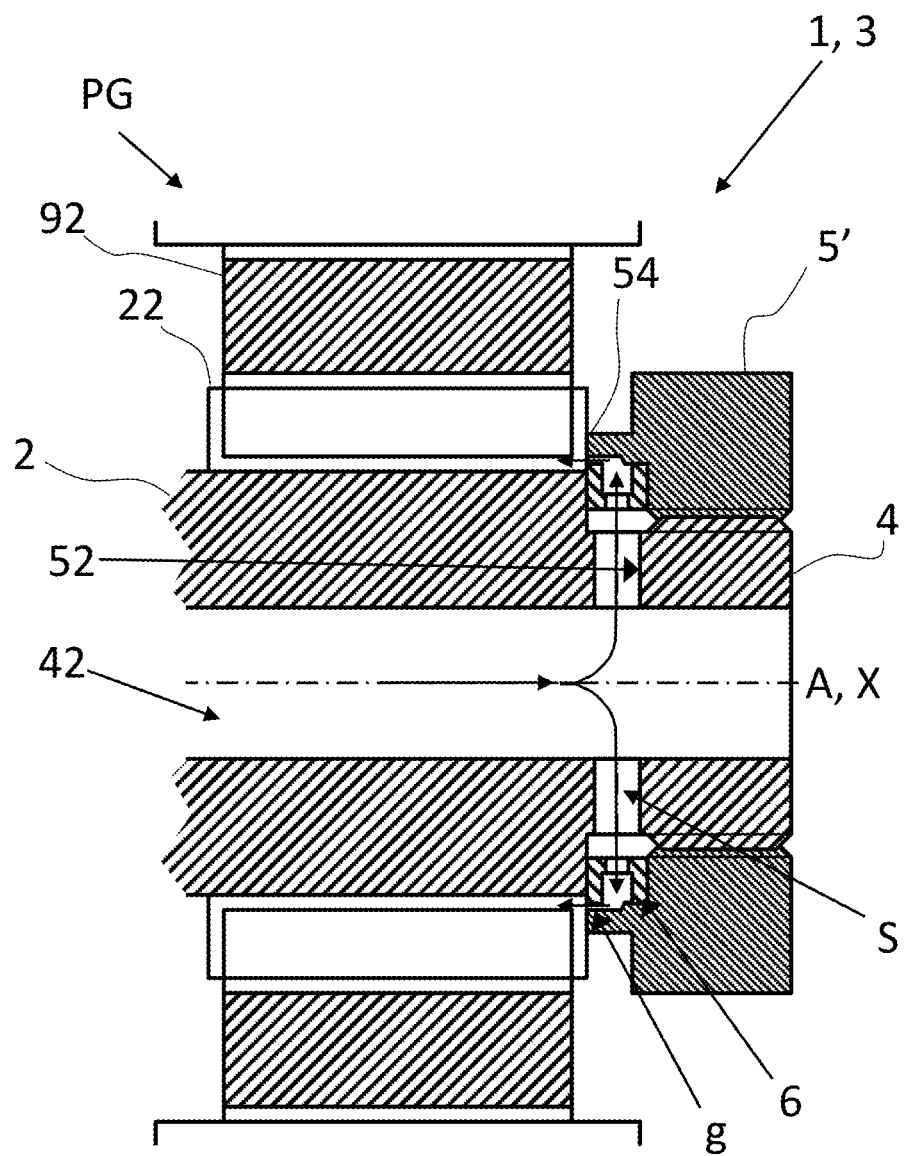

FIG. 6 is an exemplary assembly in a sectional view according to another example.

Figure 7:
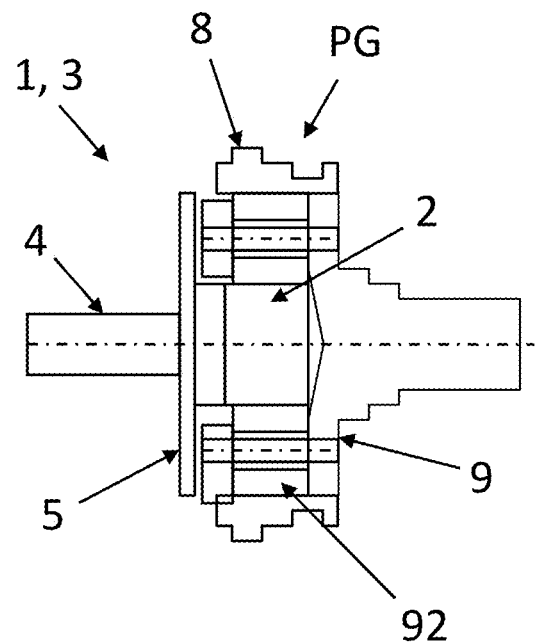

FIG. 7 is an exemplary transmission according to an example.

Figure 8:
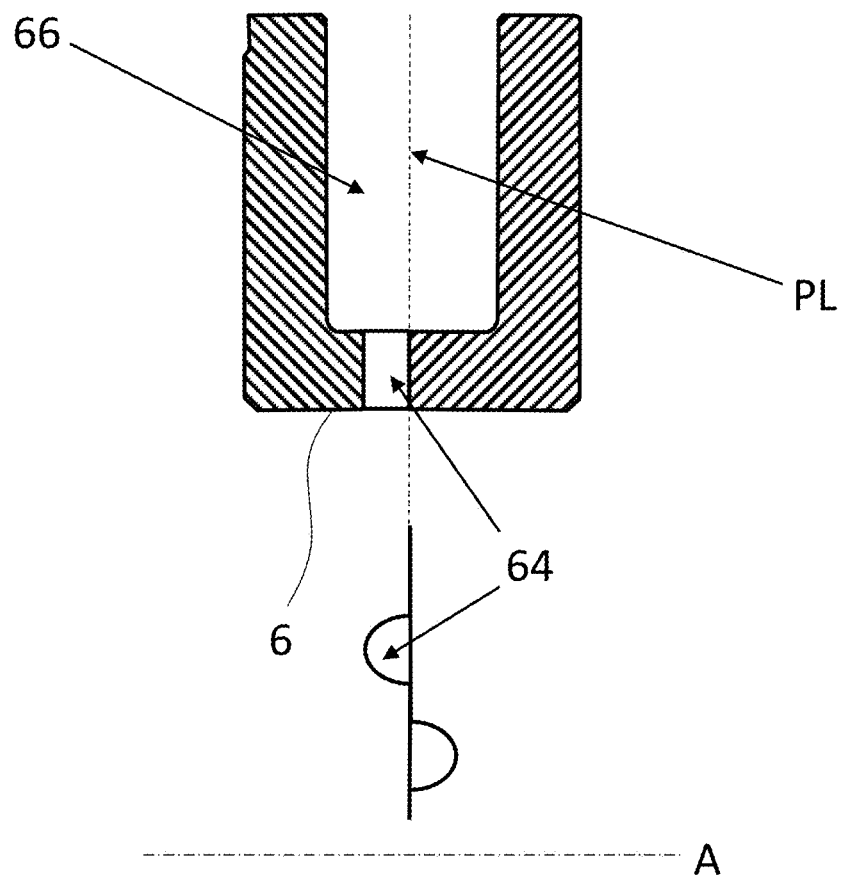

FIG. 8 is an exemplary lubricant distribution ring member according to an example.

The drawings are not necessarily drawn to scale. It shall also be noted that some details in the drawings may be exaggerated in order to better describe and illustrate the particular example. Like reference characters refer to like elements throughout the description, unless expressed otherwise.

DETAILED DESCRIPTION

The detailed description set forth below provides information and examples of the disclosed technology with sufficient detail to enable those skilled in the art to practice the disclosure.

The present disclosure may seek to provide improved lubrication for a gearwheel in a transmission. For example, an object of the present disclosure may be to provide an assembly for a gearwheel which alleviates at least one drawback of the prior art, or which at least provides a suitable alternative. Other objects of the present disclosure may be to provide an improved transmission and a vehicle, which alleviate at least one drawback of the prior art.

FIG. 1 is an exemplary vehicle 100 shown in a side view according to an example. The vehicle 100 is a truck for towing one or more trailers (not shown). It shall however be understood that the vehicle may be any other type of vehicle, such as another type of truck, a bus, a passenger car, and construction equipment, such as an excavator, a wheel loader, etc. The vehicle 100 may be driven by a user (not shown) and/or be at least partly automatically driven, i.e., it may be a vehicle comprising autonomous driving capabilities. The vehicle 100 may be a fully electric vehicle comprising one or more electric motors for generating propulsion force. The vehicle may comprise an internal combustion engine, or the vehicle may be a hybrid vehicle comprising one or more electric motors and an internal combustion engine for generating propulsion force.

The vehicle 100 comprises an assembly 1 and a transmission 3 according to examples of the disclosure. The transmission 3 may for example be configured to transfer torque from the aforementioned internal combustion engine and/or the one or more electric motors to drive wheels 110 of the vehicle 100.

FIG. 2 depicts an example of an assembly 1 for lubricating a gearwheel 2 of a transmission 3. The assembly 1 and the transmission 3 may for example be used in the vehicle 100 shown in FIG. 1. The assembly 1 comprises a shaft 4 arranged to rotate about a rotational axis A extending in an axial direction X. FIG. 2 depicts a sectional view of the assembly 1, in the form of a plane extending along the rotational axis A. The assembly 1 further comprises the gearwheel 2 which is arranged rotationally fixed on the shaft 4. As shown, the gearwheel 2 may be a separate gearwheel 2 rotationally fixed on the shaft 4. Alternatively, the gearwheel 2 may be integrated with the shaft 4.

FIG. 3 depicts the assembly 1 in FIG. 2, but in another sectional view. More specifically, FIG. 3 is a sectional view in the form of a plane which is perpendicular to the rotational axis A.

With reference to e.g., FIG. 2 and FIG. 3, the gearwheel 2 comprises a plurality of gear teeth 22 arranged circumferentially around the gearwheel 2 with respect to the rotational axis A.

The assembly 1 further comprises a first ring member 5 arranged coaxially and rotationally fixed on the shaft 4 adjacent the gearwheel 2. The first ring member 5 has an axial end face 52 comprising a circumferential portion 54 which protrudes in the axial direction X towards the gearwheel 2 such that an inner peripheral surface 542 is formed on the circumferential portion 54. The inner peripheral surface 542 of the circumferential portion 54, the axial end face 52 of the first ring member 5, the gearwheel 2, and the shaft 4, define a space S.

The assembly 1 further comprises a lubricant distribution ring member 6 for providing lubricant to gear valleys 24 (see FIG. 3) between respective adjacent gear teeth 22 of the gearwheel 2. A gear valley as used herein means a space which is between two adjacent gear teeth 22 of the gearwheel 2. The lubricant distribution ring member 6 is arranged inside the space S and coaxially with the shaft 4. At least one of the first ring member 5, the gearwheel 2 and the lubricant distribution ring member 6 is configured such that the lubricant distribution ring member 6 is axially press-fitted between the gearwheel 2 and the first ring member 5. By axially press-fitted may herein mean that at least a portion of the lubricant distribution ring member 6 is deformed in the axial direction X.

As shown in FIG. 2, the assembly 1 and/or the transmission 3 may further comprise a nut 7 for locking the gearwheel 2 and/or the first ring member 5 to the shaft 4. As shown, the nut 7 is concentric with the shaft 4 and rotationally fixed on the shaft 4.

As may be further gleaned in e.g., FIG. 2, the circumferential portion 54 of the first ring member 5 may be in axial contact with the gear teeth 22 of the gearwheel 2. Thereby, a risk of lubricant leakage from the space S may be mitigated, implying improved lubrication.

The lubricant distribution ring member 6 may as further shown have a first radially outer peripheral surface 62 which is proximate the gearwheel 2. The inner peripheral surface 542 of the circumferential portion 54 and the first radially outer peripheral surface 62 of the lubricant distribution ring member 6 may as shown (see also FIGS. 4a-c) be configured such that a radial gap g is formed therebetween, wherein the radial gap g is arranged to provide lubricant to the gear valleys 24. In the shown example, the radial gap g is configured such that lubricant can be provided in the axial direction towards the gear valleys 24.

Examples of the radial gap g is shown in FIGS. 4a-c. FIGS. 4a-c depict enlarged sectional views of the lubricant distribution ring member 6 of the assembly 1 according to examples. The sectional views are in the form of respective planes extending along the rotational axis A.

With reference to e.g., FIG. 3, the gearwheel 2 has a gear root diameter D1 which is defined as a diameter of a circle which touches bottom portions of the gear valleys 24. As may be gleaned, a diameter D2 of the first radially outer peripheral surface 62 may be larger than the gear root diameter D1.

With reference to e.g., FIGS. 4a-c, the lubricant distribution ring member 6 may as shown comprise at least one radially extending opening 64 which fluidly connects a portion of the space S inside the lubricant distribution ring member 6 with the gear valleys 24. For example, there may be a plurality of radially extending openings 64 distributed around the circumference of the lubricant distribution ring member 6.

As may be further gleaned in e.g., FIGS. 4a-c, the lubricant distribution ring member 6 may comprise a circumferentially extending lubricant reservoir 66 which fluidly connects the at least one radially extending opening 64 with the gear valleys 24.

In some examples, as e.g., shown in FIG. 2 and FIG. 3, the shaft 4 may comprise a lubricant conduit 42 which is in fluid communication with the space S. In the shown example, the lubricant conduit 42 is a bore in the shaft 4 extending in the axial direction X, which is concentric with the shaft 4. Lubricant provided to the gear valleys 24 from the lubricant conduit 42 (depicted by flow arrows) is typically pressurized so that sufficient lubrication is achieved. The lubricant as used herein may be oil or grease.

As may be further gleaned in e.g., FIGS. 4a-c, the lubricant distribution ring member 6 may be radially guided in the space S, e.g., radially press-fitted in the space S.

For example, the lubricant distribution ring member 6 may have a second radially outer peripheral surface 68. With reference to e.g., FIGS. 4a-b, the inner peripheral surface 542 of the circumferential portion 54 of the first ring member 5 and the second radially outer peripheral surface 68 of the lubricant distribution ring member 6 may be configured such that the second radially outer peripheral surface 68 is radially guided or radially press-fitted against the inner peripheral surface 542 of the circumferential portion 54 of the first ring member 5. For example, as shown, the radial press-fit (or alternatively a radial guiding) may be achieved in a corner of the space S, in this example a corner distant from the radial gap g, as seen in the axial direction X.

As another example, which may be combined with the previous example, and with reference to FIG. 4c, the lubricant distribution ring member 6 may have a radially inner peripheral surface 70 and the gearwheel 2 may have a radially outer peripheral surface 26 arranged inside the space S. The radially inner peripheral surface 70 of the lubricant distribution ring member 6 and the radially outer peripheral surface 26 of the gearwheel 2 may be configured such that the radially inner peripheral surface 70 of the lubricant distribution ring member 6 is radially guided or radially press-fitted against the radially outer peripheral surface 26 of the gearwheel 2. For example, as shown, the radial press-fit (or alternatively a radial guiding) may thus be achieved in a corner of the space S, in this example a corner distant from the radial gap g, as seen in a radial direction. In other examples not shown, which may be combined with the previous examples, the radial press-fit (or alternatively a radial guiding) may be achieved in another corner of the space S, e.g., a corner which is distant from the radial gap g, as seen in the axial direction X and in the radial direction.

With reference to e.g., FIGS. 4a-c, the axial press-fit of the lubricant distribution ring member 6 between the gearwheel 2 and the first ring member 5 may be arranged such that an axially protruding portion 56, 28, such as an axially protruding portion of the first ring member 5 (see FIGS. 4a and 4c), the gearwheel 2 (see FIG. 4b), and/or the lubricant distribution ring member 6 (not shown), deforms the lubricant distribution ring member 6 in the axial direction X. As shown, the axially protruding portion 56, 28 may be located proximate the inner peripheral surface 542 of the circumferential portion 54 of the first ring member 5, e.g., proximate one of the above-mentioned corners of the space S, and/or proximate a corner of the space S which also is proximate the radial gap g.

As further shown in e.g., FIGS. 4a-c, the lubricant distribution ring member 6 may be U-shaped, as seen in a sectional plane defined by the rotational axis A and the radial direction from the rotational axis A. For example, this shape may facilitate the axial and/or radial press-fit, e.g., allowing the lubricant distribution ring member 6 to be deformed in the radial and/or axial direction.

FIG. 5 and FIG. 6 show sectional views of other examples of assemblies 1 according to the present disclosure. The assembly 1 in FIG. 5 and FIG. 6, respectively, may be configured in a similar manner as described in the above with reference to any one of FIGS. 2-4. However, the assemblies 1 in FIG. 5 and FIG. 6 show some additional and/or alternative configurations. For example, FIG. 5 shows a configuration where the first ring member 5 is provided on the other side of the gearwheel 2 than in the example shown in FIGS. 2-4, as seen in the axial direction X. As shown, the first ring member 5 may be locked to the shaft 4 between the gearwheel 2 and the nut 7. As shown in this example, the shaft 4 may have a stop surface 44 which the gearwheel 2 is pressed towards. In another example not shown, e.g., if the first ring member 5 is on the side of the gearwheel 2 as shown in FIG. 2, the first ring member 5 may be pressed towards a similar stop surface of the shaft 4. As another example, FIG. 6 shows a configuration where the first ring member 5' is also acting as a nut for locking the gearwheel 2 to the shaft 4.

Even though the above examples show a first ring member 5, 5' which is a separate member with respect to the shaft 4, it shall be noted that in alternative embodiments the first ring member may be integrated with the shaft 4.

FIG. 7 depicts an example of a transmission 1 according to the present disclosure. Accordingly, the transmission 1 comprises an assembly 1 according to an example of the present disclosure. With reference to FIG. 2, FIG. 5, FIG. 6 and FIG. 7, the gearwheel 2 may as shown be a sun gearwheel 2 of a planetary gear PG. As may be further gleaned from e.g., FIG. 7, the first ring member 5 may be an engaging ring for selectively rotationally connecting a ring gearwheel 8 of the planetary gear PG with the shaft 4. By rotationally connecting two members is herein meant that when one of the members rotates about a rotational axis, the other member rotates simultaneously about the same rotational axis. The planetary gear PG may as shown also comprise a planet carrier 9 for carrying one or more planet gearwheels 92. Rotationally connecting the ring gearwheel 8 of the planetary gear PG with the shaft 4 will result in that there is no speed change between the shaft 4 and the planet carrier 9, i.e., a 1:1 speed ratio. This mode may be denoted as a high range mode. However, when the engaging ring 5 is disconnected from the ring gearwheel 8, and the ring gearwheel 8 is instead rotationally fixed to a housing (not shown), a speed reduction between the shaft 4 and the planet carrier 9 will be achieved. This mode may be denoted as a low range mode. The shaft 4 may be a main shaft of the transmission 1 and the planet carrier 9 may be connected to or be part of an output shaft of the transmission 1. The transmission 1 may be a vehicle transmission, comprising a plurality of additional gearwheels and a countershaft (not shown) which are configured to provide a plurality of different input/output speed ratios.

FIG. 8 depicts another example of a lubricant distribution ring member 6 according to the present disclosure in a sectional view. As shown in this example, the lubricant distribution ring member 6 may be made of at least two separate parts which are divided along a sectional plane PL which is perpendicular to the rotational axis A. In this example, the lubricant distribution ring member 6 is divided so that at least one radially extending opening 64, preferably each one of the openings if there are several such openings, are provided in the vicinity of the sectional plane PL dividing the lubricant distribution ring member 6. For example, as shown, the sectional plane PL may intersect the at least one radially extending opening 64. Thereby, the radially extending opening(s) 64 may be made more easily, such as by casting, swaging or forging. This configuration may additionally, or alternatively, result in that only one of the parts, e.g., the part forming the radial gap g, may be radially guided or radially press-fitted in the space S. Accordingly, this may imply a more cost-effective configuration since, e.g., less strict tolerance levels may be required for the other part not forming the radial gap g.

In the following, possible features and feature combinations of the disclosure are presented as a list of examples.

Example 1: An assembly (1) for lubricating a gearwheel (2) of a transmission (3), the assembly (1) comprising:
a shaft (4) arranged to rotate about a rotational axis (A) extending in an axial direction (X),
the gearwheel (2) arranged rotationally fixed on the shaft (4), the gearwheel (2) comprising a plurality of gear teeth (22) arranged circumferentially around the gearwheel (2) with respect to the rotational axis (A), a first ring member (5, 5') arranged coaxially and rotationally fixed on the shaft (4) adjacent the gearwheel (2), wherein the first ring member (5, 5') has an axial end face (52) comprising a circumferential portion (54) which protrudes in the axial direction (X) towards the gearwheel (2) such that an inner peripheral surface (542) is formed on the circumferential portion (54), wherein the inner peripheral surface (542) of the circumferential portion (54), the axial end face (52) of the first ring member (5, 5'), the gearwheel (2), and the shaft (4), define a space(S), a lubricant distribution ring member (6) for providing lubricant to gear valleys (24) between respective adjacent gear teeth (22) of the gearwheel (2), wherein the lubricant distribution ring member (6) is arranged inside the space(S), and wherein at least one of the first ring member (5, 5'), the gearwheel (2) and the lubricant distribution ring member (6) is configured such that the lubricant distribution ring member (6) is axially press-fitted between the gearwheel (2) and the first ring member (5, 5').

Example 2: The assembly (1) according to Example 1, wherein the circumferential portion (54) of the first ring member (5, 5') is in axial contact with the gear teeth (22) of the gearwheel (2).

Example 3: The assembly (1) according to any one of the preceding Examples, wherein the lubricant distribution ring member (6) has a first radially outer peripheral surface (62) which is proximate the gearwheel (2), wherein the inner peripheral surface (542) of the circumferential portion (54) and the first radially outer peripheral surface (62) of the lubricant distribution ring member (6) are configured such that a radial gap (g) is formed therebetween, wherein the radial gap (g) is arranged to provide lubricant to the gear valleys (24).

Example 4: The assembly (1) according to Example 3, wherein the gearwheel (2) has a gear root diameter (D1) which is defined as a diameter of a circle which touches bottom portions of the gear valleys (24), wherein a diameter (D2) of the first radially outer peripheral surface (62) is larger than the gear root diameter (D1).

Example 5: The assembly (1) according to any one of the preceding Examples, wherein the lubricant distribution ring member (6) comprises at least one radially extending opening (64) which fluidly connects a portion of the space(S) inside the lubricant distribution ring member (6) with the gear valleys (24).

Example 6: The assembly (1) according to Example 5, wherein the lubricant distribution ring member (6) comprises a circumferentially extending lubricant reservoir (66) which fluidly connects the at least one radially extending opening (64) with the gear valleys (24).

Example 7: The assembly (1) according to any one of the preceding Examples, wherein the shaft (4) comprises a lubricant conduit (42) which is in fluid communication with the space(S).

Example 8: The assembly (1) according to any one of the preceding Examples, wherein the lubricant distribution ring member (6) is radially guided or radially press-fitted in the space(S).

Example 9: The assembly (1) according to Example 8, wherein the lubricant distribution ring member (6) has a second radially outer peripheral surface (68), wherein the inner peripheral surface (542) of the circumferential portion (54) of the first ring member (5, 5') and the second radially outer peripheral surface (68) of the lubricant distribution ring member (6) are configured such that the second radially outer peripheral surface (68) is radially guided or radially press-fitted against the inner peripheral surface (542) of the circumferential portion (54) of the first ring member (5, 5').

Example 10: The assembly (1) according to any one of Examples 8-9, wherein the lubricant distribution ring member (6) has a radially inner peripheral surface (70) and wherein the gearwheel (2) has a radially outer peripheral surface (26) arranged inside the space(S), wherein the radially inner peripheral surface (70) of the lubricant distribution ring member (6) and the radially outer peripheral surface (26) of the gearwheel (2) are configured such that the radially inner peripheral surface (70) of the lubricant distribution ring member (6) is radially guided or radially press-fitted against the radially outer peripheral surface (26) of the gearwheel (2).

Example 11: The assembly (1) according to any one of the preceding Examples, wherein the axial press-fit of the lubricant distribution ring member (6) between the gearwheel (2) and the first ring member (5, 5') is arranged such that an axially protruding portion (56, 28), such as an axially protruding portion of the first ring member (5, 5'), the gearwheel (2), and/or the lubricant distribution ring member (6), deforms the lubricant distribution ring member (6) in the axial direction (X).

Example 12: The assembly (1) according to Example 11, wherein the axially protruding portion (56, 28) is located proximate the inner peripheral surface (542) of the circumferential portion (54) of the first ring member (5, 5').

Example 13: The assembly (1) according to any one of the preceding Examples, wherein the lubricant distribution ring member (6) is U-shaped, as seen in a sectional plane defined by the rotational axis (A) and a radial direction from the rotational axis (A).

Example 14: The assembly (1) according to any one of the preceding Examples, wherein the gearwheel (2) is a sun gearwheel (2) of a planetary gear (PG).

Example 15: The assembly (1) according to Example 14, wherein the first ring member (5) is an engaging ring for selectively rotationally connecting a ring gearwheel (8) of the planetary gear (PG) with the shaft (4).

Example 16: The assembly (1) according to any one of the preceding Examples, wherein the gearwheel (2) is a separate member with respect to the shaft (4) or integrated with the shaft (4).

Example 17: The assembly (1) according to any one of the preceding Examples, wherein the first ring member (5, 5') is a separate member with respect to the shaft (4) or integrated with the shaft (4).

Example 18: The assembly (1) according to any one of the preceding Examples, wherein the lubricant distribution ring member (6) is made of at least two separate parts which are divided along a sectional plane which is perpendicular to the rotational axis (A).

Example 19: A transmission (3) for a vehicle (100) comprising the assembly (1) according to any one of the preceding Examples.

Example 20: A vehicle (100) comprising the assembly (1) according to Examples 1-18 or the transmission (3) according to Example 19.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. An assembly for lubricating a gearwheel of a transmission, the assembly comprising:
    a shaft arranged to rotate about a rotational axis extending in an axial direction,
    the gearwheel arranged rotationally fixed on the shaft, the gearwheel comprising a plurality of gear teeth arranged circumferentially around the gearwheel with respect to the rotational axis,
    a first ring member arranged coaxially and rotationally fixed on the shaft adjacent the gearwheel, wherein the first ring member has an axial end face comprising a circumferential portion which protrudes in the axial direction towards the gearwheel such that an inner peripheral surface is formed on the circumferential portion, wherein the inner peripheral surface of the circumferential portion, the axial end face of the first ring member, the gearwheel, and the shaft, define a space, and
    a lubricant distribution ring member for providing lubricant to gear valleys between respective adjacent gear teeth of the gearwheel, wherein the lubricant distribution ring member is arranged inside the space, and wherein at least one of the first ring member, the gearwheel and the lubricant distribution ring member is configured such that the lubricant distribution ring member is axially press-fitted between the gearwheel and the first ring member.

2. The assembly according to claim 1, wherein the circumferential portion of the first ring member is in axial contact with the gear teeth of the gearwheel.

3. The assembly according to claim 1, wherein the lubricant distribution ring member has a first radially outer peripheral surface which is proximate the gearwheel, wherein the inner peripheral surface of the circumferential portion and the first radially outer peripheral surface of the lubricant distribution ring member are configured such that a radial gap is formed therebetween, wherein the radial gap is arranged to provide lubricant to the gear valleys.

4. The assembly according to claim 3, wherein the gearwheel has a gear root diameter which is defined as a diameter of a circle which touches bottom portions of the gear valleys, wherein a diameter of the first radially outer peripheral surface is larger than the gear root diameter.

5. The assembly according to claim 1, wherein the lubricant distribution ring member comprises at least one radially extending opening which fluidly connects a portion of the space inside the lubricant distribution ring member with the gear valleys.

6. The assembly according to claim 5, wherein the lubricant distribution ring member comprises a circumferentially extending lubricant reservoir which fluidly connects the at least one radially extending opening with the gear valleys.

7. The assembly according to claim 1, wherein the shaft comprises a lubricant conduit which is in fluid communication with the space.

8. The assembly according to claim 1, wherein the lubricant distribution ring member is radially guided or radially press-fitted in the space.

9. The assembly according to claim 8, wherein the lubricant distribution ring member has a second radially outer peripheral surface, wherein the inner peripheral surface of the circumferential portion of the first ring member and the second radially outer peripheral surface of the lubricant distribution ring member are configured such that the second radially outer peripheral surface is radially guided or radially press-fitted against the inner peripheral surface of the circumferential portion of the first ring member.

10. The assembly according to claim 8, wherein the lubricant distribution ring member has a radially inner peripheral surface and wherein the gearwheel has a radially outer peripheral surface arranged inside the space, wherein the radially inner peripheral surface of the lubricant distribution ring member and the radially outer peripheral surface of the gearwheel are configured such that the radially inner peripheral surface of the lubricant distribution ring member is radially guided or radially press-fitted against the radially outer peripheral surface of the gearwheel.

11. The assembly according to claim 1, wherein the axial press-fit of the lubricant distribution ring member between the gearwheel and the first ring member is arranged such that an axially protruding portion, the gearwheel, and/or the lubricant distribution ring member, deforms the lubricant distribution ring member in the axial direction.

12. The assembly according to claim 11, wherein the axially protruding portion is located proximate the inner peripheral surface of the circumferential portion of the first ring member.

13. The assembly according to claim 1, wherein the lubricant distribution ring member is U-shaped, as seen in a sectional plane defined by the rotational axis and a radial direction from the rotational axis.

14. A transmission for a vehicle comprising the assembly according to claim 1.

15. A vehicle comprising the assembly according to claim 1.

* * * * *